(12) United States Patent
Li

(10) Patent No.: US 9,057,006 B2
(45) Date of Patent: Jun. 16, 2015

(54) PHOTO-CURING AND STRIPPABLE ADHESIVE COMPOSITION AND USES THEREOF

(71) Applicant: CHI MEI CORPORATION, Tainan (TW)

(72) Inventor: Kuang-Chieh Li, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

(21) Appl. No.: 14/266,429

(22) Filed: Apr. 30, 2014

(65) Prior Publication Data

US 2014/0335352 A1    Nov. 13, 2014

(30) Foreign Application Priority Data

May 13, 2013   (TW) .............................. 102116815 A

(51) Int. Cl.
| | | |
|---|---|---|
| C08F 2/46 | (2006.01) | |
| G03G 9/097 | (2006.01) | |
| B41M 7/00 | (2006.01) | |
| A61L 2/08 | (2006.01) | |
| A61L 24/00 | (2006.01) | |
| C08G 61/04 | (2006.01) | |
| C09J 151/08 | (2006.01) | |
| C08G 18/67 | (2006.01) | |
| C09J 175/16 | (2006.01) | |

(52) U.S. Cl.
CPC .......... *C09J 151/08* (2013.01); *Y10T 428/2887* (2015.01); *C08G 18/672* (2013.01); *C09J 175/16* (2013.01)

(58) Field of Classification Search
CPC ................................. C09J 9/00; C09J 151/08
USPC ................. 522/75, 74, 71, 189, 184, 1; 520/1
See application file for complete search history.

(56) References Cited

U.S. PATENT DOCUMENTS

| | | | |
|---|---|---|---|
| 2001/0008691 A1 * | 7/2001 | Isogai et al. | 428/412 |
| 2004/0143034 A1 * | 7/2004 | Primke et al. | 523/176 |
| 2008/0299346 A1 * | 12/2008 | Onderisin et al. | 428/41.8 |
| 2012/0172477 A1 * | 7/2012 | Huang et al. | 522/33 |

FOREIGN PATENT DOCUMENTS

| | | | |
|---|---|---|---|
| JP | 2008-156498 | | 7/2008 |
| JP | 2008-156499 | | 7/2008 |
| JP | 2013-023630 | * | 2/2013 |
| JP | 2014-009314 | * | 1/2014 |
| TW | 268040 | | 1/1996 |
| TW | 201226499 A1 | | 7/2012 |

OTHER PUBLICATIONS

Yurugi, JP 2013-023630 Machine Translation, Feb. 4, 2013.*
Araike et al, JP 2014-009314 Machine Translation, Jan. 20, 2014.*
Office action issued on Aug. 27, 2014 for the corresponding Taiwan Patent Application No. 102116815.
English translation of the search report from the Taiwan Office Action dated Aug. 27, 2014.
US20120172477 is the counterpart application for TW201226499.
English abstract translation for TW268040.

* cited by examiner

*Primary Examiner* — Ling Choi
*Assistant Examiner* — Jessica E Whiteley
(74) *Attorney, Agent, or Firm* — WPAT, P.C.; Anthony King; Kay Yang

(57) ABSTRACT

The invention relates to a photo-curing and strippable adhesion composition, and it has the advantage of good reworkability and weatherability. The invention also provides a strippable material and method for manufacturing the same and an electronic component and method for manufacturing the same.

19 Claims, No Drawings

PHOTO-CURING AND STRIPPABLE ADHESIVE COMPOSITION AND USES THEREOF

BACKGROUND OF THE INVENTION

1. Field of the Invention

The invention relates to a strippable adhesive material for an adhesive tape or adhesive sheet of an electronic material. Particularly, the invention relates a photo-curing and strippable adhesive composition and method for producing a strippable adhesive material, strippable adhesive material, electronic component and method for producing an electronic component.

2. Description of the Related Art

Because of good maneuverability and good adhesion properties, adhesive tape and adhesive sheets are widely used in the industry. In the field of electronic equipment, a variety of adhesive tapes and adhesive sheets have been used in adhering various components. In order to achieving better stripability, various stripping agents are usually coated on a strippable film such as the adhesive tapes and adhesive sheets.

As for the stripping agents, they are required to have stable stripability, and other properties are also required such as residual adhesive rate after using the stripping agents and reworkability. In addition, in order to obtain a smoother surface, the appearance of the coating is also important.

The conventional stripping agents are divided into a thermosetting resin type and a thermoplastic resin type. The thermosetting resin type has a problem of poor solvent resistance because no curing occurs after coating. On the other hand, although the solvent resistance is satisfactory of the thermoplastic resin type, it has problems of thin thickness and poor thermo resistance because of thermo curing occurs after coating.

Furthermore, one of the main resin of the thermoplastic resin type uses a crosslinking agent such as melamine to cure an alkyd resin as disclosed in Japanese Patent Publication Nos. 2008-156498 and 2008-156499. Although high performance is achieved by the use of the crosslinking agent such as melamine for curing the alkyd resin, the curing is usually too heavy to make the film become brittle. In addition, the coating film is prone to fracture when stripping the coating film and the reworkability is poor. Furthermore, the use of the crosslinking agent such as melamine also fails to meet the requirement of weatherability in this field.

Therefore, overcoming the problems of reworkability and weatherability of a photo-curing and strippable adhesive material to meet the current requirements is the target in the field of the present invention.

SUMMARY OF THE INVENTION

In the present invention, the specific resin is provided to obtain a photo-curing and strippable adhesive composition with good reworkability and weatherability.

Therefore, the present invention provides a photo-curing and strippable adhesive composition comprising:
- a polyurethane acrylate oligomer (A);
- a compound having an ethylenically unsaturated group (B);
- a photoinitiator (C); and
- a polyolefin wax (D);
- wherein said polyurethane acrylate oligomer (A) comprises an aliphatic polyurethane acrylate oligomer (A-1) and/or aromatic polyurethane acrylate oligomer (A-2); the compound having an ethylenically unsaturated group (B) comprises a compound (B-1) selected from the group consisting of Formulae (1), (2) and (3),

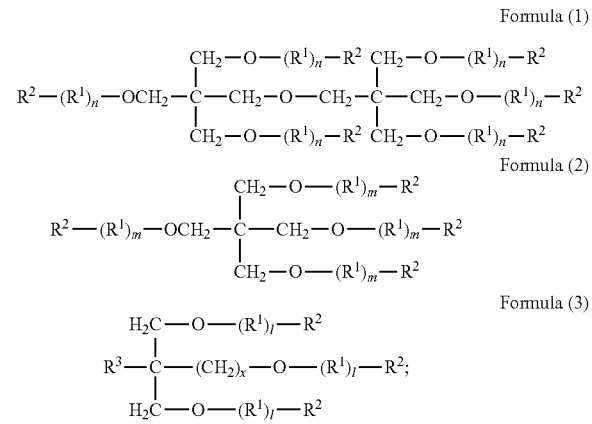

in Formulae (1) to (3),
$R^1$ independently represents —($CH_2CH_2O$)— or —($CH_2CH(CH_3)O$)—;
$R^2$ independently represents an acryloyl group, a methacryloyl group or a hydrogen atom;
$R^3$ independently represents a hydrogen atom, a C1 to C6 alkyl group or an aryl group;
in Formula (1), a total number of the acryloyl group and methacryloyl group is 5 or 6;
in Formula (2), a total number of the acryloyl group and methacryloyl group is 3 or 4;
in Formula (3), a total number of the acryloyl group and methacryloyl group is 3;
n independently represents an integer of 0 to 6, and a total number of n is 3 to 24;
m independently represents an integer of 0 to 6, and a total number of m is 2 to 16;
l independently represents an integer of 0 to 10, and a total number of l is 3 to 30; and
x represents an integer of 0 to 3.

The present invention also provides a method for producing a strippable material comprising coating the photo-curing and strippable adhesive composition as mentioned above on a substrate.

The present invention also provides a strippable material, which is obtained by the method as mentioned above.

The present invention further provides an electronic device, comprising the strippable material as mentioned above.

The present invention further provides a method for producing an electronic device, comprising the method as mentioned above for providing a strippable material.

DETAILED DESCRIPTION OF THE INVENTION

The invention relates to a photo-curing and strippable adhesive composition comprising:
- a polyurethane acrylate oligomer (A);
- a compound having an ethylenically unsaturated group (B);
- a photoinitiator (C); and
- a polyolefin wax (D);
- wherein said polyurethane acrylate oligomer (A) comprises an aliphatic polyurethane acrylate oligomer (A-1) and/or aromatic polyurethane acrylate oligomer (A-2);

the compound having an ethylenically unsaturated group (B) comprises a compound (B-1) selected from the group consisting of Formulae (1), (2) and (3), Formula (1)
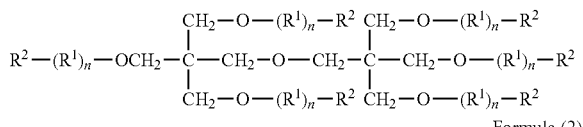

Formula (2)
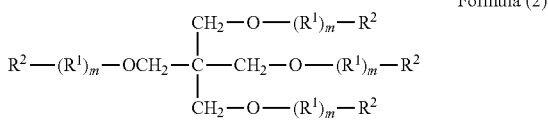

Formula (3)
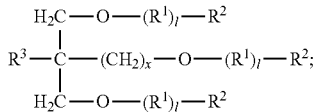

in Formulae (1) to (3), $R^1$ independently represents —(CH$_2$CH$_2$O)— or —(CH$_2$CH(CH$_3$)O)—;

$R^2$ independently represents an acryloyl group, a methacryloyl group or a hydrogen atom;

$R^3$ independently represents a hydrogen atom, a C1 to C6 alkyl group or an aryl group;

in Formula (1), a total number of the acryloyl group and methacryloyl group is 5 or 6;

in Formula (2), a total number of the acryloyl group and methacryloyl group is 3 or 4;

in Formula (3), a total number of the acryloyl group and methacryloyl group is 3;

n independently represents an integer of 0 to 6, and a total number of n is 3 to 24;

m independently represents an integer of 0 to 6, and a total number of m is 2 to 16;

l independently represents an integer of 0 to 10, and a total number of l is 3 to 30; and x represents an integer of 0 to 3.

The polyurethane acrylate oligomer (A) according to the invention comprises an aliphatic polyurethane acrylate oligomer (A-1) and/or aromatic polyurethane acrylate oligomer (A-2).

According to the invention, examples of the aliphatic polyurethane acrylate oligomer (A-1) are aliphatic polyurethane acrylate oligomer (A-1) bifunctional aliphatic polyurethane acrylate oligomer CN9002; bifunctional aliphatic polyurethane acrylate oligomer CN9004; bifunctional aliphatic polyurethane acrylate oligomer CN9005 (Tg=–10° C.); hexafunctional aliphatic polyurethane acrylate oligomer CN9006 (Tg=83° C.); bifunctional aliphatic polyurethane acrylate oligomer CN9007; bifunctional aliphatic polyurethane acrylate oligomer CN9178; bifunctional aliphatic polyurethane acrylate oligomer CN9290US, (Tg=–28° C.); bifunctional aliphatic polyurethane oligomer CN940; bifunctional aliphatic polyurethane oligomer CN9788; trifunctional aliphatic polyurethane acrylate oligomer CN989; bifunctional aliphatic polyurethane oligomer CN9893; polyurethane oligomer CN996; aliphatic polyurethane acrylate oligomer CN9009 (Tg=40° C.); aliphatic polyurethane acrylate oligomer CN9010 (Tg=103° C.); aliphatic polyurethane acrylate oligomer CN3211; aliphatic polyurethane acrylate oligomer CN9001 (Tg=60° C.); aliphatic polyurethane acrylate oligomer CN2920 (Tg=59° C.); aliphatic polyurethane oligomer CN9011; trifunctional aliphatic polyester polyurethane acrylate oligomer CN929 (Tg=17° C.); aliphatic polyester polyurethane diacrylate oligomer CN962 (Tg=–38° C.); aliphatic polyester polyurethane diacrylate oligomer CN965 (Tg=–37° C.); aliphatic polyester polyurethane diacrylate oligomer CN991; polyurethane acrylate oligomer CN980 (Tg=–29° C.); aliphatic polyester/polyether polyurethane diacrylate oligomer CN-981 (Tg=22° C.); aliphatic polyester polyurethane diacrylate oligomer CN964 (Tg=–24° C.); aliphatic polyester polyurethane hexaacrylate oligomer CN968 (Tg=34° C.); aliphatic polyester polyurethane diacrylate oligomer CN983; aliphatic polyester polyurethane diacrylate oligomer CN984; trifunctional aliphatic polyester polyurethane acrylate oligomer CN9008 (Tg=111° C.); aliphatic polyurethane acrylate CN9024; polyfunctional polyurethane acrylate oligomer CN9013 (Tg=143° C.); aliphatic polyurethane acrylate oligomer CN9014 (Tg=–41° C.) (all manufactured by Sartomer Inc.); and LAROMER UA19T, LAROMER UA 9028 V, LAROMER UA 9030V, LAROMER LR 8987, LAROMER UA 9029V, and LAROMER UA 9033V (all manufactured by BASF Inc.).

According to the invention, examples of the aromatic polyurethane acrylate oligomer (A-2) are aromatic polyurethane triacrylate oligomer CN2901 (Tg=35° C.); aromatic polyurethane triacrylate oligomer CN2902 (Tg=25° C.); bifunctional aromatic polyurethane triacrylate oligomer CN9782; bifunctional aromatic polyurethane triacrylate oligomer CN9783; aromatic polyester polyurethane diacrylate oligomer CN992; aromatic polyurethane acrylate oligomer CN994 (Tg=50° C.); low-viscosity aromatic polyurethane oligomer CN999 (Tg=97° C.); hexa-functional aromatic polyurethane acrylate oligomer CN997; brominated aromatic polyurethane acrylate oligonucleotide oligomer CN2600 (Tg=88.8° C.); brominated polyurethane acrylate oligomer containing 25% isobornyl acrylate CN902J75; hexa-functional aromatic polyurethane acrylate oligomer CN975 (Tg=–12° C.); aromatic polyether polyurethane diacrylate oligomer CN978 (Tg=–40° C.); aromatic polyether polyurethane triacrylate oligomer CN972 (Tg=–47° C.); polyurethane acrylate CN9022 (Tg=–16° C.) (all manufactured by Sartomer Inc.) and LAROMER UA 9031V (manufactured by BASF Inc.).

In the embodiment of the invention, the polyurethane acrylate oligomer (A) may contain a viscous liquid oligomer polymer with hundreds to thousands of weight average molecular weight. Preferably, the weight average molecular weight of the polyurethane acrylate oligomer (A) is from about 300 to about 5000; preferably from about 500 to about 3000; more preferably from about 700 to about 2000.

In one embodiment of the invention, a glass transition temperature of the polyurethane acrylate oligomer (A) is from about –80° C. to about 200° C.; preferably from about –60° C. to about 160° C.; more preferably form about –40° C. to about 120° C. to achieve better reworkability.

If the aliphatic polyurethane acrylate oligomer (A-1) or aromatic polyurethane acrylate oligomer (A-2) is absent, the reworkability is poor.

The compound having an ethylenically unsaturated group (B) is preferably a polymeric compound of olefin group having more than 2 carbon atoms such as an ethylene group, propylene group, and butylene group, etc. The compound having an ethylenically unsaturated group (B) comprises a compound (B-1) selected from the group consisting of Formulae (1), (2) and (3),

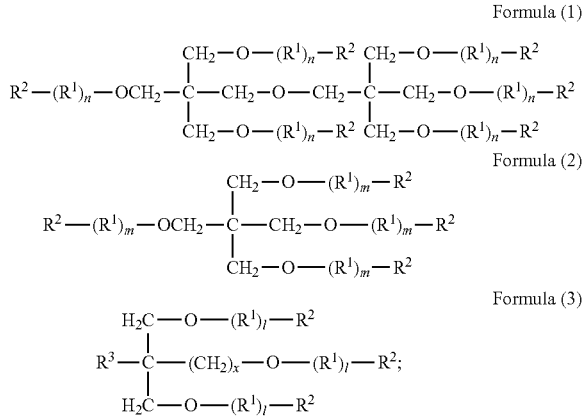

Formula (1)

Formula (2)

Formula (3)

in Formulae (1) to (3), $R^1$ independently represents —(CH$_2$CH$_2$O)— or —(CH$_2$CH(CH$_3$)O)—;

$R^2$ independently represents an acryloyl group, a methacryloyl group or a hydrogen atom;

$R^3$ independently represents a hydrogen atom, a C1 to C6 alkyl group or an aryl group;

in Formula (1), a total number of the acryloyl group and methacryloyl group is 5 or 6;

in Formula (2), a total number of the acryloyl group and methacryloyl group is 3 or 4;

in Formula (3), a total number of the acryloyl group and methacryloyl group is 3;

n independently represents an integer of 0 to 6, and a total number of n is 3 to 24; n preferably independently represents an integer of 0 to 4, and a total number of n is preferably 6 to 12;

m independently represents an integer of 0 to 6, and a total number of m is 2 to 16; m preferably independently represents an integer of 0 to 4, and a total number of m is preferably 4 to 8;

l independently represents an integer of 0 to 10, and a total number of l is 3 to 30; and x represents an integer of 0 to 3.

Preferably, in Formula (1), (2) or (3), —(CH$_2$CH$_2$O)— or —(CH$_2$CH(CH$_3$)O)— of $R^1$ links to $R^2$ through the terminal of the oxygen side.

The structure of the compound (B-1) can be a combination of two or more compounds of the Formula (1), (2) or (3). Preferably, in Formula (1), six $R^2$s are all the acryloyl group.

The compound represented by Formula (1) or (2) can be synthesized according to a conventional method as follows: carrying on a ring-opening addition reaction of pentaerythritol or dipentaerythritol with ethylene oxide or propylene oxide to link a ring-opened frame; and introducing a (meth)acryloyl group by reacting (meth)acryloyl chloride and a terminal hydroxyl group of the ring-opened frame. The steps of the procedure are well known. Artisans skilled in the field of the present invention are able to synthesize the compound represented by Formula (1) or (2).

Preferably, the compound represented by Formula (1) or (2) is pentaerythritol derivatives and/or dipentaerythritol derivatives.

Examples of the compound represented by Formula (1) are compounds represented by Formulae (a) to (d); wherein a total number of n in Formulae (a) and (d) is 6; a total number of n in Formulae (b) and (c) is 12. Preferably, the compound represented by Formula (1) is compounds represented by Formulae (a) and (b). Commercial products are also available such as KAYARAD DPEA-12 (manufactured by Nippon Kayaku Co., Ltd.).

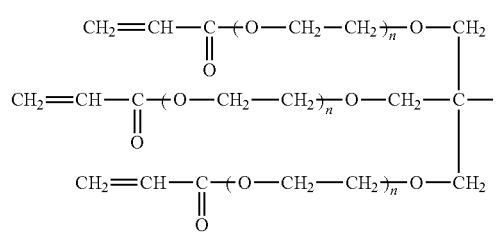
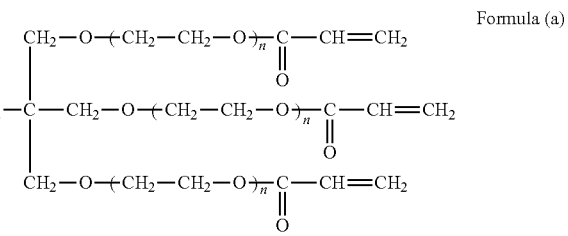

Formula (a)

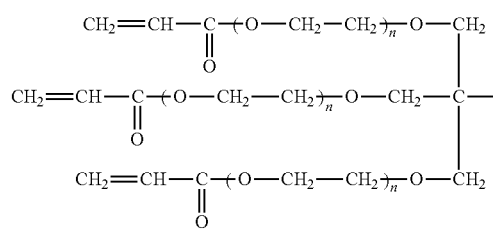
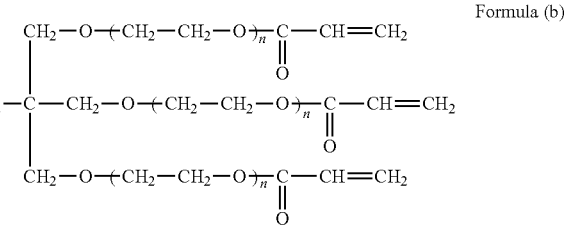

Formula (b)

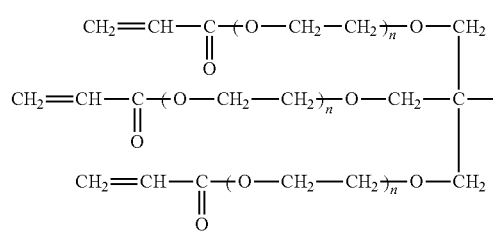
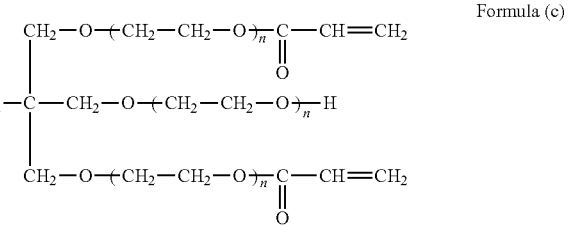

Formula (c)

-continued

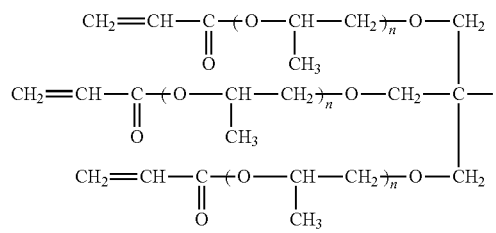
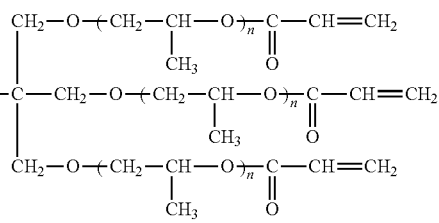

Formula (d)

Examples of the compound represented by Formula (2) are compounds represented by Formulae (e) to (f), ethoxylated pentaerythritol tetraacrylate or propoxylated pentaerythritol tetraacrylate; wherein a total number of m in Formula (e) is 4; a total number of m in Formula (f) is 12. Commercial products are also available such as EM2411, EM2421 (both manufactured by Eternal Chemical Industries, Ltd.), Miramer M4004 (manufactured by TOYO KAGAKU, INC.).

(B-2). The other compound having an ethylenically unsaturated group (B-2) according to the present invention comprises but is not limited to a first compound, a second compound, or a combination thereof.

The first compound according to the invention is a (meth)acrylate compound obtained by reacting a caprolactone-modified polyol with a (meth)acrylic acid.

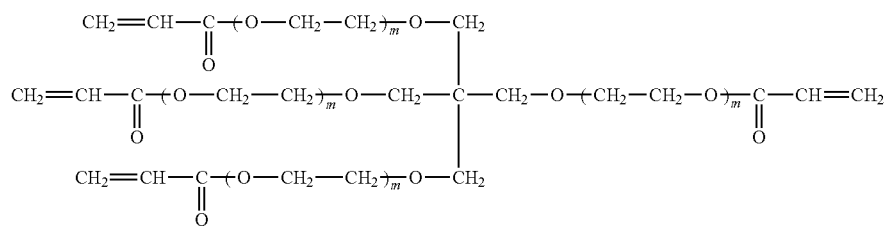

Formula (e)

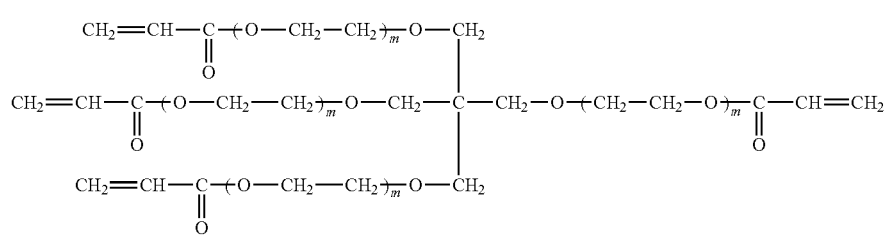

Formula (f)

Examples of the compound represented by Formula (3) are ethoxylated trimethylolpropane triacrylate, ethoxylated trimethylolpropane trimethacrylate, propoxylated trimethylolpropane triacrylate, and propoxylated glyceryl triacrylate. Commercial products are also available such as KAYARAD GPO-303, KAYARAD THE-330, KAYARAD TPA-320, KAYARAD TPA-330 (all manufactured by Nippon Kayaku Co., Ltd.), M-310, M-321, M-350, M-360, M-460 (all manufactured by Toa Gosei Co., Ltd.), SR415, SR454, SR492, SR499, CD501, SR502, SR9020, SR9021, SR9035 (all manufactured by Sartomer Inc.), EM2380, EM2381, EM2382, EM2383, EM2384, EM2385, EM2386, EM2387, EM3380 (all manufactured by Eternal Chemical Industries, Ltd.), Miramer M3130, Miramer M3160, Miramer M3190, Miramer M360 (all manufactured by TOYO KAGAKU, INC.).

If the compound having an ethylenically unsaturated group (B-1) selected from the group consisting of Formulae (1), (2) and (3) is absent, the weatherability is poor.

In one embodiment of the invention, the compound having an ethylenically unsaturated group (B) further comprises an other compound having an ethylenically unsaturated group The caprolactone-modified polyol is obtained by reacting a caprolactone with a polyol having more than 4 functional groups. The caprolactone may be γ-caprolactone, δ-caprolactone or ε-caprolactone, and wherein preferably is ε-caprolactone. The aforesaid polyol having more than 4 functional groups may be pentaerythritol, ditrimethylolpropane, dipentaerythritol and the like. The amount of the caprolactone is preferably 1 to 12 mol based on the 1 mole of the polyol having more than 4 functional groups.

Examples of the first compound are pentaerythritol caprolactone-modified tetra(meth)acrylate, ditrimethylolpropane caprolactone-modified tetra(meth)acrylate, and dipentaerythritol caprolactone-modified poly(meth)acrylate. The aforesaid dipentaerythritol caprolactone-modified poly(meth)acrylate may be dipentaerythritol caprolactone-modified di(meth)acrylate, dipentaerythritol caprolactone-modified tri(meth)acrylate, dipentaerythritol caprolactone-modified tetra(meth)acrylate, dipentaerythritol caprolactone-modified penta(meth)acrylate, and dipentaerythritol caprolactone-modified hexa(meth)acrylate.

Furthermore, the structure of dipentaerythritol caprolactone-modified poly(meth)acrylate is represented by Formula (4)

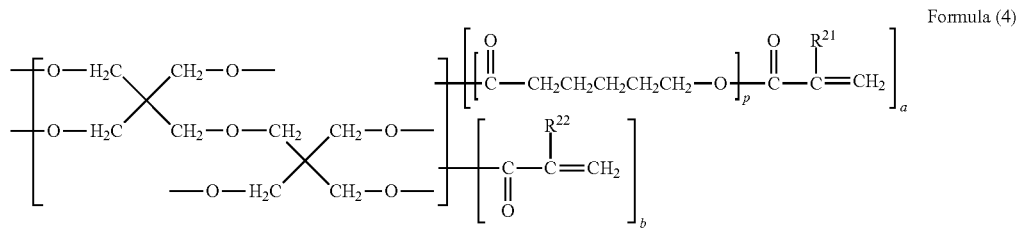

Formula (4)

In the structure of Formula (4), $R^{21}$ and $R^{22}$ each represents hydrogen or methyl; p is an integer of from 1 to 2; a is an integer of 1 to 6; b is an integer of 0 to 5; wherein a+b=2 to 6; preferably a+b=3 to 6; more preferably a+b=5 to 6, and most preferably a+b=6.

More particularly, the first compound is KAYARAD® DPCA-20, DPCA-30, DPCA-60, DPCA-120 manufactured by Nippon Kayaku Co., Ltd.

The second compound comprises a functional group represented by Formula (5),

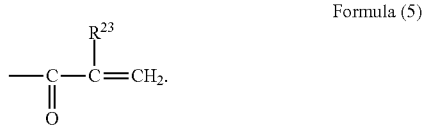

Formula (5)

In the structure of Formula (5), $R^{23}$ represents hydrogen or methyl.

Examples of the second compound are acrylamide, (meth)acryloylmorpholine, 7-amino-3,7-dimethyloctyl (meth)acrylate, iso-butoxymethyl (meth)acrylamide, iso-bornyloxyethyl (meth)acrylate, iso-bornyl (meth)acrylate, 2-ethylhexyl (meth)acrylate, ethyl diethylene glycol (meth)acrylate, t-octyl (meth)acrylamide, diacetone (meth)acrylamide, dimethylaminoethyl (meth)acrylate, dodecyl (meth)acrylate, dicyclopentenyloxyethyl (meth)acrylate (abbreviated as FA-512A), dicyclopentenyl (meth)acrylate, N,N-dimethyl (meth)acrylamide, tetrachlorophenyl (meth)acrylate, 2-tetrachlorophenoxy ethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate, ethylene glycol di(meth)acrylate, dicyclopentenyl di(meth)acrylate, triethylene glycol diacrylate, tetraethylene glycol di(meth)acrylate, tri(2-hydroxyethyl) isocyanate di(meth)acrylate, tri (2-hydroxyethyl) isocyanate tri(meth)acrylate, caprolactone-modified tri(2-hydroxyethyl) isocyanate tri(meth)acrylate, trimethylolpropyl tri(meth)acrylate, ethylene oxide (hereinafter abbreviated as EO) modified trimethylolpropyl tri (meth)acrylate, propylene oxide (hereinafter abbreviated as PO) modified trimethylolpropyl tri(meth)acrylate, tripropylene glycol di(meth)acrylate, neo-pentyl glycol di(meth) acrylate, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa (meth)acrylate, dipentaerythritol penta(meth)acrylate, dipentaerythritol tetra(meth)acrylate (abbreviated as DPTMA), caprolactone-modified dipentaerythritol hexa(meth)acrylate, caprolactone-modified dipentaerythritol penta(meth)acrylate, ditrimethylolpropyl tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, phenol novolac polyglycidyl ether (meth)acrylate, or the like.

Preferably, the second compound is selected from trimethylolpropyl triacrylate, pentaerythritol triacrylate, pentaerythritol tetracrylate, dipentaerythritol hexaacrylate, dipentaerythritol pentaacrylate, dipentaerythritol tetraacrylate, ditrimethylolpropyl tetraacrylate, and TO-1382 (manufactured by Toa Gosei Co., Ltd.). The aforesaid examples of the compound having an ethylenic group can be used alone or in admixture of two or more thereof.

In one embodiment of the invention, based on 100 parts by weight of the used amount of the polyurethane acrylate oligomer (A), the used amount of the compound having an ethylenically unsaturated group (B) is from 1 to 30 parts by weight; preferably from 3 to 27 parts by weight; more preferably from 5 to 25 parts by weight.

In one embodiment of the invention, based on 100 parts by weight of the used amount of the polyurethane acrylate oligomer (A), the used amount of the compound (B-1) is from 1 to 20 parts by weight; preferably from 3 to 17 parts by weight; more preferably from 5 to 15 parts by weight.

Examples of the photoinitiator (C) according to the invention are acetophenone, biimidazole, acyl oxime, or combinations thereof.

Examples of the acetophenone are p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthio phenyl)-2-morpholino-1-propanone, or 2-benzyl-2-N,N-dimethylamino-1-(4-morpholinophenyl)-1-butanone.

Examples of the biimidazole are 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methyl phenyl)-4,4',5,5'-tetraphenyl-biimidazole, 2,2'-bis(o-methoxyphenyl)-4,4',5,5'-tetraphenyl-biimidazole, 2,2'-bis (o-ethylphenyl)-4,4',5,5'-tetraphenyl-biimidazole, 2,2'-bis (p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, or 2,2'-bis(2,4-dichlorophenyl)-4,4',5,5'-tetraphenyl-biimidazole.

Examples of the acyl oxime are ethanone, 1-[9-ethyl-6-(2-methylbenzoyl)-9H-carbazole-3-yl]-, 1-(O-acetyl oxime) (CGI-242, manufactured by Ciba Specialty Chemicals, as shown in Formula (6)), 1-(4-phenyl-thio-phenyl)-octane-1,2-dion 2-oxime-O-benzoate (CGI-124, manufactured by Ciba Specialty Chemicals, as shown in Formula (7)), or ethanone, 1-[9-ethyl-6-(2-chloro-4-benzyl-thio-benzoyl)-9H-carbazole-3-yl]-, 1-(O-acetyl oxime) (manufactured by Adeka Corporation, as shown in Formula (8)).

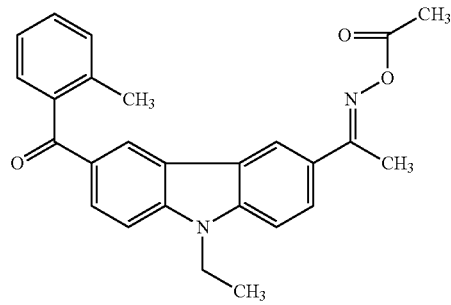

Formula (6)

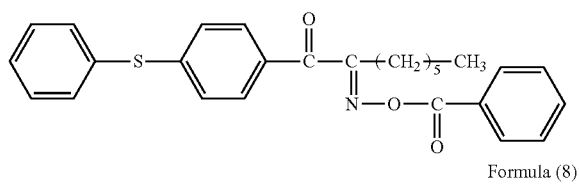

Formula (7)

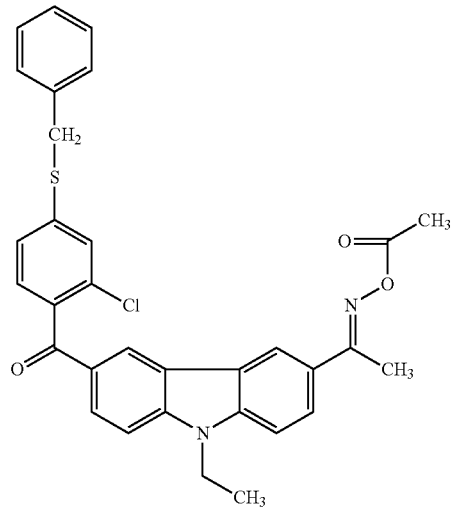

Formula (8)

Preferably, the photoinitiator (C) is 2-methyl-1-(4-methylthio phenyl)-2-morpholino-1-propanone, 2-benzyl-2-N,N-dimethylamino-1-(4-morpholinophenyl)-1-butanone, 2,2'-bis(o-fluorophenyl)-4,4',5,5'-tetraphenyl-biimidazole, Ethanone, 1-[9-ethyl-6-(2-methylbenzoyl)-9H-carbazole-3-yl]-, 1-(O-acetyl oxime), or combinations thereof.

According to the invention, the photoinitiator (C) optionally further comprises: benzophenone such as thioxanthone, 2,4-diethyl-thioxanthanone, thioxanthone-4-sulfone, benzophenone, 4,4'-bis(dimethylamino)benzophenone, and 4,4'-bis(diethylamino)benzophenone; α-diketone such as benzyl, and acetyl; acyloin such as benzoin; acyloin ether such as benzoin methylether, benzoin ethylether, and benzoin isopropyl ether; acylphosphineoxide such as 2,4,6-trimethyl-benzoyl-diphenyl-phosphineoxide and bis-(2,6-dimethoxy-benzoyl)-2,4,4-trimethyl-benzyl-phosphineoxide; quinine such as anthraquinone and 1,4-naphthoquinone; halide such as phenacyl chloride, tribromomethyl-phenylsulfone and tris(trichloromethyl)-s-triazine; peroxide such as di-tertbutylperoxide; preferably are benzophenone; more preferably are 4,4'-bis(dimethylamino)benzophenone.

In one embodiment of the invention, based on 100 parts by weight of the used amount of the polyurethane acrylate oligomer (A), the used amount of the photoinitiator (C) is from 1 to 10 parts by weight; preferably is from 2 to 9 parts by weight; more preferably is form 3 to 8 parts by weight.

According to the invention, a melting point of the polyolefin wax (D) is preferably from 115° C. to 160° C. If the melting point of the polyolefin wax (D) is from 115° C. to 160° C., the reworkability is better.

Examples of the polyolefin wax with a melting point more than 115° C. (hereafter as high melting-point polyolefin wax) are a polyolefin wax obtained by (co)polymerizing at least one olefin having a carbon number of 1 to 5 selected from the group consisting of ethylene, propylene, 1-butylene, and 4-methyl-1-pentylene; and a modified polyolefin wax obtained by modifying the above mentioned polyolefin wax by oxidation, acid modification and copolymerization with other ethylene monomer. The polyolefin wax can be used solely or in combinations. The melting point is measured according to DSC method.

Examples of the polyolefin wax (D) are a polyethylene wax such as High Wax (trade name) 100P (melting point: 116° C.), High Wax 200P (melting point: 122° C.), High Wax 400P (melting point: 126° C.), High Wax 800P (melting point: 127° C.), High Wax 410P (melting point: 118° C.), High Wax 405MP (melting point: 121° C.), High Wax 4400G (melting point: 120° C.), High Wax 4051E (melting point: 115° C.) (all manufactured by Mitsui Chemicals Co., Ltd.); Polyethylene (trade name) AC-8 (melting point: 116° C.), AC-8A (melting point: 116° C.), AC-9 (melting point: 119° C.), AC-9A (melting point: 119° C.), AC-316A (melting point: 140° C.), AC-325 (melting point: 137° C.), AC-330 (melting point: 137° C.), AC-392 (melting point: 138° C.) and AC-395 (melting point: 137° C.) (all manufactured by Allied Signal); POLYWAX (product name) 2000 (melting point: 126° C.) and POLYWAX 3000 (melting point: 126° C.) (both manufactured by PETROLITE Corporation); a polypropylene wax such as High Wax NP055 (melting point: 135° C. to 145° C.), High Wax NP105 (melting point: 140° C. to 148° C.) and High Wax NP805 (melting point: 145° C. to 152° C.). Other examples are EXCEREX 30200B (melting point: 102° C.), EXCEREX 30050B (melting point: 91° C.), EXCEREX 48070B (melting point: 90° C.), EXCEREX 15341PA (melting point: 89° C.) (all manufactured by Mitsui Chemicals Co., Ltd.), CERAFLOUR 913 (melting point: 160° C.), CERAFLOUR 914 (melting point: 160° C.), CERAFLOUR 915 (melting point: 160° C.), CERAFLOUR 928 (melting point: 115° C.), CERAFLOUR 970 (melting point: 160° C.), CERAFLOUR 988 (melting point: 140° C.) (all manufactured by BYK).

According to the present invention, a weight average molecular weight of the polyolefin wax (D) is from 5,000 to 100,000; preferably from 6,000 to 90,000; more preferably from 7,000 to 80,000.

If the polyolefin wax is absent, the reworkability is poor.

In one embodiment of the invention, based on 100 parts by weight of the used amount of the polyurethane acrylate oligomer (A), the used amount of the polyolefin wax (D) is from 1 to 20 parts by weight; preferably form 3 to 17 parts by weight; more preferably from 5 to 15 parts by weight.

The photo-curing and strippable adhesive composition according to the invention preferably further comprises an additive (E), such as a filler, a modifier, a defoaming agent, a colorant, or an adhesive agent. Examples of the filler are barium sulfate, silicon oxide, magnesium oxide, aluminum hydroxide, aluminum oxide, aluminium nitride, boron nitride, and calcium carbonate, and preferably the filler is powder. Examples of the modifier are manganese naphthenate and the like and metal salts such as manganese octenate. Examples of the defoaming agent are silicone oil, fluorine oil, and polycarboxylic acid polymers. Examples of the colorant are inorganic pigments, organic pigments, organic dyes and the like. Examples of the organic pigments are C. I. Pigment B1, 2, 15, 15:3, 15:4, 15:6, 16, 22, 60, 66; C. I. Pigment C1, 7.

In one preferred embodiment of the invention, a method for producing the photo-curing and strippable adhesive composition according to the invention comprises dispersing the aforementioned polyurethane acrylate oligomer (A), the compound having an ethylenically unsaturated group (B), the photoinitiator (C), the polyolefin wax (D) and the optional additives (E) and heating to 50° C. and stirring for 1 to 48 hours in a mixer to dissolve the solids to form the photo-curing and strippable adhesive composition. In general, the viscosity of the photo-curing and strippable adhesive composition can be adjusted by artisans skilled in this field according to the coating, volatility and other properties. When the viscosity of the photo-curing and strippable adhesive composition is 0.1 to 30 Pa·S, the strippable adhesive composition has a better coating property; preferably, the viscosity is 0.1 to 20 Pa·S; more preferably, 0.1 to 10 Pa·S.

The present invention also provides a method for producing a strippable material comprising coating the strippable adhesive composition as mentioned above on a substrate. Preferably, the substrate is an electronic component.

According to the invention, the electronic component suitable for the treatment with the photo-curing and strippable adhesive composition includes but is not limited to a circuit board equipped with microprocessors, transistors, capacitors, resistors, relays, or transformers, wherein the circuit board has patterns of lead wires or wire harness in need of the treatment.

According to the present invention, the treatment of the electronic component with the photo-curing and strippable adhesive composition can be a known coating procedure, such as dipping, brush coating, spray coating, and dispenser coating. In one preferred embodiment of the invention, the electronic component is further irradiated with UV light after coating to obtain the electronic device according to the invention.

The present invention also provides a strippable material, which is obtained by the method as mentioned above.

The present invention further provides an electronic device, comprising the strippable material as mentioned above.

The present invention further provides a method for producing an electronic device, comprising the method as mentioned above for providing a strippable material.

The following examples are given for the purpose of illustration only and are not intended to limit the scope of the present invention.

EXAMPLES

Example 1

A four-necked flask was equipped with a stirrer, a heater and a thermometer, and the composition with the amount as shown in Table 1 are added. The composition comprised: the aliphatic polyurethane acrylate oligomer (A-1-1) 100 parts by weight; the compound having an ethylene-containing unsaturated group (B-1-1a) 1 part by weight, the photoinitiator (C-1) 0.5 parts by weight; and the photoinitiator (C-2) 0.5 parts by weight. Then, the temperature was raise to 50° C. and the composition was stirred for 1 hour. Subsequently, the polyolefin wax (D-1) 20 parts by weight and the additive (E-1) 1 part by weight were added and the above temperature condition was maintained for stirring for 5 hours to obtain the photo-curing and strippable adhesive composition. The photo-curing and strippable adhesive composition was evaluated according to the following method, and the results are shown in Table 1.

Examples 2 to 11, Comparative Examples 2 to 3 and Comparative Example 6

The preparations are similar to that of Example 1 with modifications of the kinds and amounts of the aliphatic polyurethane acrylate oligomer (A-1-1), the compound having an ethylene-containing unsaturated group (B-1-1a), the photoinitiator (C-1), the photoinitiator (C-2), the polyolefin wax (D-1), and the additive (E-1). The compositions and the results of the assays are shown in Tables 1 and 2.

Comparative Example 1

A four-necked flask was equipped with a stirrer, a heater and a thermometer, and the composition with the amount as shown in Table 2 are added. The composition comprised: the viscoelastic resin (F-1) 100 parts by weight; the compound having an ethylene-containing unsaturated group (B-1-1a) 10 part by weight, the photoinitiator (C-1) 4 parts by weight; and the photoinitiator (C-2) 2 parts by weight. Then, the temperature was raise to 50° C. and the composition was stirred for 1 hour. Subsequently, the polyolefin wax (D-1) 10 parts by weight was added and the above temperature condition was maintained for stirring for 5 hours to obtain the photo-curing and strippable adhesive composition. The photo-curing and strippable adhesive composition was evaluated according to the following method, and the results are shown in Table 2.

Comparative Examples 4 to 5 and 7 to 8

The preparations are similar to that of Example 1 with modifications of the kinds and amounts of the viscoelastic resin (F-1), the compound having an ethylene-containing unsaturated group (B-1-1a), the photoinitiator (C-1), the photoinitiator (C-2), the polyolefin wax (D-1), and the additive (E-1). The compositions and the results of the assays are shown in Table 2.

TABLE 1

| | | | Examples | | | | | | | | | | | |
|---|---|---|---|---|---|---|---|---|---|---|---|---|---|---|
| | | | | | | | | Example | | | | | | |
| Components | | | 1 | 2 | 3 | 4 | 5 | 6 | 7 | 8 | 9 | 10 | 11 |
| polyurethane acrylate oligomer (A) (parts by weight) | Aliphatic polyurethane acrylate oligomer (A-1) | A-1-1 | 100 | | | | | | | | 30 | | |
| | | A-1-2 | | 100 | | | | | | | | 50 | |
| | | A-1-3 | | | 100 | | | | | | | | 70 |
| | | A-1-4 | | | | 100 | | | | | | | |
| | Aromatic polyurethane acrylate oligomer (A-2) | A-2-1 | | | | | 100 | | | 70 | | | |
| | | A-2-2 | | | | | | 100 | | | 50 | | |
| | | A-2-3 | | | | | | | 100 | | | | 30 |
| | | A-2-4 | | | | | | | | 100 | | | |

TABLE 1-continued

Examples

| Components | | | 1 | 2 | 3 | 4 | 5 | 6 | 7 | 8 | 9 | 10 | 11 |
|---|---|---|---|---|---|---|---|---|---|---|---|---|---|
| compound having an ethylene-containing unsaturated group (B) (parts by weight) | Compound (B-1) selected from the group consisting of Formulae (1), (2) and (3) | B-1-1a | 1 | | | | | | 2 | | | 4 | |
| | | B-1-1b | | 4 | | | | | | 4 | | | 10 |
| | | B-1-2a | | | 8 | | | | 2 | | 4 | | |
| | | B-1-2b | | | | 12 | | | | 2 | | 8 | |
| | | B-1-3a | | | | | 16 | | | | 4 | | 10 |
| | | B-1-3b | | | | | | 20 | | | 2 | | |
| | Other compound having an ethylene-containing unsaturated group (B-2) | B-2-1 | | 10 | | | | | | | | | |
| | | B-2-2 | | | | | | | 5 | | | | |
| Photoinitiator (C) (parts by weight) | | C-1 | 0.5 | 1 | 2 | 6 | 4 | 5 | 6 | 7 | 8 | 9 | 10 |
| | | C-2 | 0.5 | | | | 3 | 4 | 4 | 3 | 2 | 1 | |
| Polyolefin wax (D) (parts by weight) | | D-1 | 20 | | | | 4 | | | | 10 | | |
| | | D-2 | | 15 | | | | 3 | | | | 5 | |
| | | D-3 | | | 10 | | | | 2 | | | | 1 |
| | | D-4 | | | | 5 | | | | 1 | | | |
| Additives (E) (parts by weight) | | E-1 | 1 | | | | | | | | | | |
| | | E-2 | | | | | | 5 | | | | | |
| Viscoelastic resin (F) (parts by weight) | | F-1 | | | | | | | | | | | |
| | | F-2 | | | | | | | | | | | |
| Assays | Reworkability | | ◎ | ○ | ◎ | ○ | ◎ | ○ | ◎ | ○ | ◎ | ◎ | ◎ |
| | weatherability | | ◎ | ◎ | ◎ | ◎ | ◎ | ◎ | ◎ | ◎ | ◎ | ◎ | ◎ |

A-1-1 polyfunctional polyurethane acrylate oligomer CN9013 (Tg=143° C.) (manufactured by Sartomer Inc.)
A-1-2 aliphatic polyester polyurethane diacrylate oligomer CN962 (Tg=−38° C.) (manufactured by Sartomer Inc.)
A-1-3 aliphatic polyurethane acrylate oligomer CN2920 (Tg=59° C.) (manufactured by Sartomer Inc.)
A-1-4 aliphatic polyurethane acrylate oligomer CN9014 (Tg=−41° C.) (manufactured by Sartomer Inc.)
A-2-1 low-viscosity aromatic polyurethane oligomer CN999 (Tg=97° C.) (manufactured by Sartomer Inc.)
A-2-2 aromatic polyether polyurethane diacrylate oligomer CN978 (Tg=−40° C.) (manufactured by Sartomer Inc.)
A-2-3 aromatic polyurethane triacrylate oligomer CN2902 (Tg=25° C.) (manufactured by Sartomer Inc.)
A-2-4 aromatic polyether polyurethane triacrylate oligomer CN972 (Tg=−47° C.) (manufactured by Sartomer Inc.)
B-1-1a Compound represented by Formula (a)
B-1-1b Compound represented by Formula (d)
B-1-2a Miramer M4004 (manufactured by TOYO KAGAKU, INC.)
B-1-2b EM2421 (manufactured by Eternal Chemical Industries, Ltd.)
B-1-3a M-460 (manufactured by Toa Gosei Co., Ltd.)
B-1-3b KAYARAD TPA-330 (manufactured by Nippon Kayaku Co., Ltd.)
B-2-1 TO-1382 (manufactured by Toa Gosei Co., Ltd.)
B-2-2 KAYARAD DPCA-20 (manufactured by Nippon Kayaku Co., Ltd.)
C-1 2-methyl-1-(4-methylthio phenyl)-2-morpholino-1-propanone
C-2 2,2'-bis(o-fluorophenyl)-4,4',5,5'-tetraphenyl-biimidazole
D-1 CERAFLOUR 970 (melting point: 160° C.) (manufactured by BYK)
D-2 AC-316A (melting point: 140° C.) (manufactured by Allied Signal)
D-3 High Wax 4051E (melting point: 115° C.) (manufactured by Mitsui Chemicals Co., Ltd.)
D-4 EXCEREX 15341PA (melting point: 89° C.) (manufactured by Mitsui Chemicals Co., Ltd.)
E-1 silicone oil
E-2 manganese naphthenate
F-1 Kraton D1120 (75% diblock and 25% styrene) (manufactured by Kraton Corp.)
F-2 Kraton G1726 (70% diblock and 30% styrene) (manufactured by Kraton Corp.)

TABLE 2

Comparative Examples

| Components | | | 1 | 2 | 3 | 4 | 5 | 6 | 7 | 8 |
|---|---|---|---|---|---|---|---|---|---|---|
| polyurethane acrylate | Aliphatic polyurethane | A-1-1 | | 100 | | | | | | |
| | | A-1-2 | | | | | | | | |

TABLE 2-continued

Comparative Examples

| | Components | | Comparative Example 1 | 2 | 3 | 4 | 5 | 6 | 7 | 8 |
|---|---|---|---|---|---|---|---|---|---|---|
| oligomer (A) (parts by weight) | acrylate oligomer (A-1) | A-1-3 | | | | | | 100 | | |
| | | A-1-4 | | | | | | | | |
| | Aromatic polyurethane acrylate oligomer (A-2) | A-2-1 | | | 100 | | | | | |
| | | A-2-2 | | | | | | | | |
| | | A-2-3 | | | | | | | | |
| | | A-2-4 | | | | | | | | |
| compound having an ethylene-containing unsaturated group (B) (parts by weight) | compound (B-1) selected from the group consisting of Formulae (1), (2) and (3) | B-1-1a | 10 | | | | | | | |
| | | B-1-1b | | | | | | | | |
| | | B-1-2a | | | | 10 | | | | |
| | | B-1-2b | | | | | | | | |
| | | B-1-3a | | | | | 10 | | | |
| | | B-1-3b | | | | | | | | |
| | Other compound having an ethylene-containing unsaturated group (B-2) | B-2-1 | | 10 | | 10 | | | 10 | |
| | | B-2-2 | | | | | | 10 | | 10 |
| Photoinitiator (C) (parts by weight) | C-1 | | 4 | 4 | 4 | 4 | 4 | 4 | 4 | 4 |
| | C-2 | | | 2 | | | 2 | | 2 | 2 |
| Polyolefin wax (D) (parts by weight) | D-1 | | 10 | | | 10 | | | | |
| | D-2 | | | 10 | | | | | | |
| | D-3 | | | | | | | | | |
| | D-4 | | | | | | | | | |
| Additives (E) (parts by weight) | E-1 | | | | | | | | | |
| | E-2 | | | | | | | | | |
| Viscoelastic resin (F) (parts by weight) | F-1 | | 100 | | | 100 | | | 100 | |
| | F-2 | | | | | | 100 | | | 100 |
| Assays | Reworkability | | X | ○ | X | X | X | Δ | X | X |
| | weatherability | | ○ | X | ○ | X | ○ | X | X | X |

A-1-1 polyfunctional polyurethane acrylate oligomer CN9013 (Tg=143° C.) (manufactured by Sartomer Inc.)
A-1-2 aliphatic polyester polyurethane diacrylate oligomer CN962 (Tg=−38° C.) (manufactured by Sartomer Inc.)
A-1-3 aliphatic polyurethane acrylate oligomer CN2920 (Tg=59° C.) (manufactured by Sartomer Inc.)
A-1-4 aliphatic polyurethane acrylate oligomer CN9014 (Tg=−41° C.) (manufactured by Sartomer Inc.)
A-2-1 low-viscosity aromatic polyurethane oligomer CN999 (Tg=97° C.) (manufactured by Sartomer Inc.)
A-2-2 aromatic polyether polyurethane diacrylate oligomer CN978 (Tg=−40° C.) (manufactured by Sartomer Inc.)
A-2-3 aromatic polyurethane triacrylate oligomer CN2902 (Tg=25° C.) (manufactured by Sartomer Inc.)
A-2-4 aromatic polyether polyurethane triacrylate oligomer CN972 (Tg=−47° C.) (manufactured by Sartomer Inc.)
B-1-1a Compound represented by Formula (a)
B-1-1b Compound represented by Formula (d)
B-1-2a Miramer M4004 (manufactured by TOYO KAGAKU, INC.)
B-1-2b EM2421 (manufactured by Eternal Chemical Industries, Ltd.)
B-1-3a M-460 (manufactured by Toa Gosei Co., Ltd.)
B-1-3b KAYARAD TPA-330 (manufactured by Nippon Kayaku Co., Ltd.)
B-2-1 TO-1382 (manufactured by Toa Gosei Co., Ltd.)
B-2-2 KAYARAD DPCA-20 (manufactured by Nippon Kayaku Co., Ltd.)
C-1 2-methyl-1-(4-methylthio phenyl)-2-morpholino-1-propanone
C-2 2,2'-bis(o-fluorophenyl)-4,4',5,5'-tetraphenyl-biimidazole
D-1 CERAFLOUR 970 (melting point: 160° C.) (manufactured by BYK)
D-2 AC-316A (melting point: 140° C.) (manufactured by Allied Signal)
D-3 High Wax 4051E (melting point: 115° C.) (manufactured by Mitsui Chemicals Co., Ltd.)
D-4 EXCEREX 15341PA (melting point: 89° C.) (manufactured by Mitsui Chemicals Co., Ltd.)
E-1 silicone oil
E-2 manganese naphthenate
F-1 Kraton D1120 (75% diblock and 25% styrene) (manufactured by Kraton Corp.)
F-2 Kraton G1726 (70% diblock and 30% styrene) (manufactured by Kraton Corp.)

Assays

Reworkability

The photo-curing and strippable adhesive composition was coated on a 100 mm×100 mm of rectangular glass substrate to form an 3 mm×100 mm of coating film with a screen printing machine (manufactured by Ever Sharp Technology Co., Ltd, ES-300SR). The film was irradiated with UV light and then quickly pulled at a speed of 10 cm/s in the direction perpendicular to the substrate. The criteria of the assay are shown blow:

⊚: the film was completely pulled without fracture, and no residual film stayed on the substrate.

○: the film was completely pulled without fracture, and few residual film stayed on the substrate.

Δ: the film was pulled without fracture, and a large amount of residual film stayed on the substrate X: the film was pulled with fracture, and a large amount of residual film stayed on the substrate Weatherability The photo-curing and strippable adhesive composition was coated on a 100 mm×100 mm of rectangular glass substrate to form an 3 mm×100 mm of coating film with a screen printing machine (manufactured by Ever Sharp Technology Co., Ltd, ES-300SR). The film was irradiated with UV light and stayed in the temperature and humidity chamber (Terchy system, model MHE-408RL) at 40° C. and 90% humidity for 20 hours. Then, the film was quickly pulled at a speed of 10 cm/s in the direction perpendicular to the substrate. The criteria of the assay are shown blow:

◎: the film was completely pulled without fracture, and no residual film stayed on the substrate.

○: the film was completely pulled without fracture, and few residual film stayed on the substrate.

Δ: the film was pulled without fracture, and a large amount of residual film stayed on the substrate X: the film was pulled with fracture, and a large amount of residual film stayed on the substrate While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A photo-curing and strippable adhesive composition comprising:
    a polyurethane acrylate oligomer (A);
    a compound having an ethylenically unsaturated group (B);
    a photoinitiator (C); and
    a polyolefin wax (D);
    wherein said polyurethane acrylate oligomer (A) comprises an aliphatic polyurethane acrylate oligomer (A-1) and aromatic polyurethane acrylate oligomer (A-2) and the ratio of (A-1)/(A-2) is from 30/70 to 70/30; the compound having an ethylenically unsaturated group (B) comprises a compound (B-1) selected from the group consisting of Formulae (1), (2) and (3),

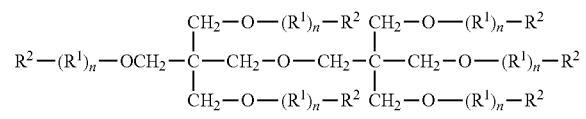

Formula (1)

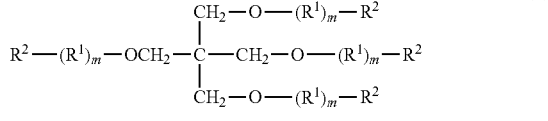

Formula (2)

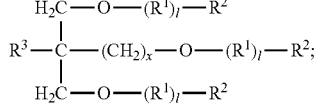

Formula (3)

in Formulae (1) to (3),
$R^1$ independently represents —(CH$_2$CH$_2$O)— or —(CH$_2$CH(CH$_3$)O)—;
$R^2$ independently represents an acryloyl group, a methacryloyl group or a hydrogen atom;
$R^3$ independently represents a hydrogen atom, a C1 to C6 alkyl group or an aryl group;
in Formula (1), a total number of the acryloyl group and methacryloyl group is 5 or 6;
in Formula (2), a total number of the acryloyl group and methacryloyl group is 3 or 4;
in Formula (3), a total number of the acryloyl group and methacryloyl group is 3;
n independently represents an integer of 0 to 6, and a total number of n is 3 to 24;
m independently represents an integer of 0 to 6, and a total number of m is 2 to 16;
l independently represents an integer of 0 to 10, and a total number of l is 3 to 30; and
x represents an integer of 0 to 3.

2. The photo-curing and strippable adhesive composition according to claim 1, wherein a glass transition temperature of the polyurethane acrylate oligomer (A) is from −80° C. to 200° C.

3. The photo-curing and strippable adhesive composition according to claim 1, based on 100 parts by weight of the used amount of the polyurethane acrylate oligomer (A), the used amount of the compound having an ethylenically unsaturated group (B) is from 1 to 30 parts by weight; the used amount of the photoinitiator (C) is from 1 to 10 parts by weight; the used amount of the polyolefin wax (D) is from 1 to 20 parts by weight.

4. The photo-curing and strippable adhesive composition according to claim 1, based on 100 parts by weight of the used amount of the polyurethane acrylate oligomer (A), the used amount of the compound (B-1) is from 1 to 20 parts by weight.

5. The photo-curing and strippable adhesive composition according to claim 1, wherein a melting point of the polyolefin wax (D) is from 115° C. to 160° C.

6. A method for producing a strippable material comprising coating the photo-curing and strippable adhesive composition according to claim 1 on a substrate.

7. The method according to claim 6, wherein a glass transition temperature of the polyurethane acrylate oligomer (A) is from −80° C. to 200° C.

8. The method according to claim 6, based on 100 parts by weight of the used amount of the polyurethane acrylate oligomer (A), the used amount of the compound having an ethylenically unsaturated group (B) is from 1 to 30 parts by weight; the used amount of the photoinitiator (C) is from 1 to 10 parts by weight; the used amount of the polyolefin wax (D) is from 1 to 20 parts by weight.

9. The method according to claim 6, based on 100 parts by weight of the used amount of the polyurethane acrylate oligomer (A), the used amount of the compound (B-1) is from 1 to 20 parts by weight.

10. The method according to claim 6, wherein a melting point of the polyolefin wax (D) is from 115° C. to 160° C.

11. The method according to claim 6, wherein the substrate is an electronic component.

12. A strippable material, which is obtained by the method according to claim 6.

13. The strippable material according to claim 12, wherein a glass transition temperature of the polyurethane acrylate oligomer (A) is from −80° C. to 200° C.

14. The strippable material according to claim 12, based on 100 parts by weight of the used amount of the polyurethane acrylate oligomer (A), the used amount of the compound having an ethylenically unsaturated group (B) is from 1 to 30 parts by weight; the used amount of the photoinitiator (C) is from 1 to 10 parts by weight; the used amount of the polyolefin wax (D) is from 1 to 20 parts by weight.

15. The strippable material according to claim 12, based on 100 parts by weight of the used amount of the polyurethane acrylate oligomer (A), the used amount of the compound (B-1) is from 1 to 20 parts by weight.

16. The strippable material according to claim 12, wherein a melting point of the polyolefin wax (D) is from 115° C. to 160° C.

17. The strippable material according to claim 12, wherein the substrate is an electronic component.

18. An electronic device, comprising the strippable material according to claim 12.

19. A method for producing an electronic device, comprising the method according to claim 6 for providing a strippable material.

* * * * *